Jan. 7, 1947.  M. FRANKEL ET AL  2,413,915
PNEUMATIC TIRE
Filed April 6, 1945

INVENTOR.
MORRIS FRANKEL AND
LEO FRANKEL
BY
ATTORNEY

Patented Jan. 7, 1947

2,413,915

UNITED STATES PATENT OFFICE 2,413,915

PNEUMATIC TIRE

Morris Frankel and Leo Frankel,
Los Angeles, Calif.

Application April 6, 1945, Serial No. 586,895

2 Claims. (Cl. 152—338)

This invention relates to a pneumatic tire and in particular to a multiple chamber type inner tube or tire and means for simultaneously inflating the several chambers.

One object of our invention is to provide a pneumatic tire which will not collapse and become useless if punctured. Another object is to provide an inner tube for a tire having multiple segmental chambers. Still another object is to provide means by which the independent segmental chambers of a tire may be simultaneously inflated or deflated. Another object is to provide a multiple valve device for a segmental tire. These and other objects are attained by our invention which is described more fully below, and shown in the accompanying drawing, in which—

Figure 1:
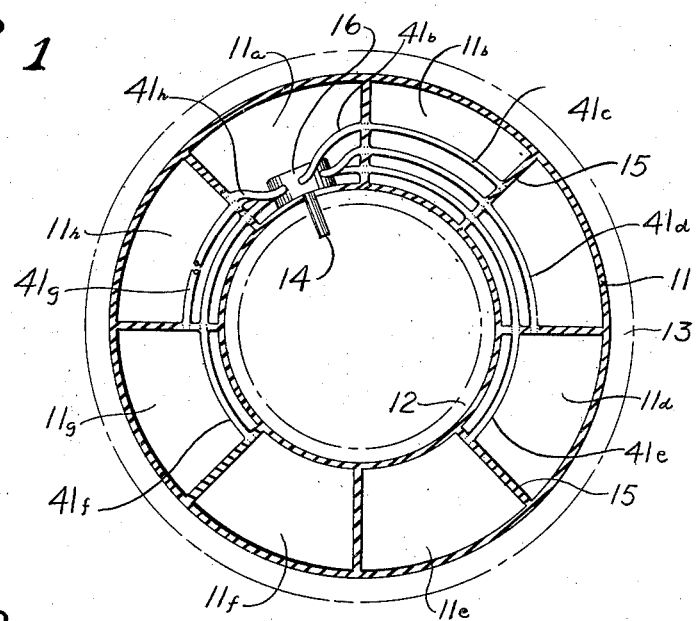
Fig. 1 is a side elevational view partly in section showing our pneumatic tire with valve device for simultaneous inflation and deflation.
Figure 2:
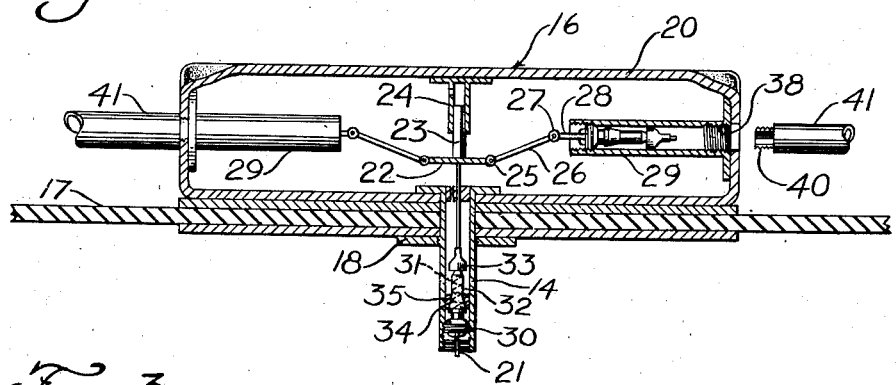
Fig. 2 is an enlarged side elevational view, partly in section of the multiple valve device for our tire.
Figure 3:
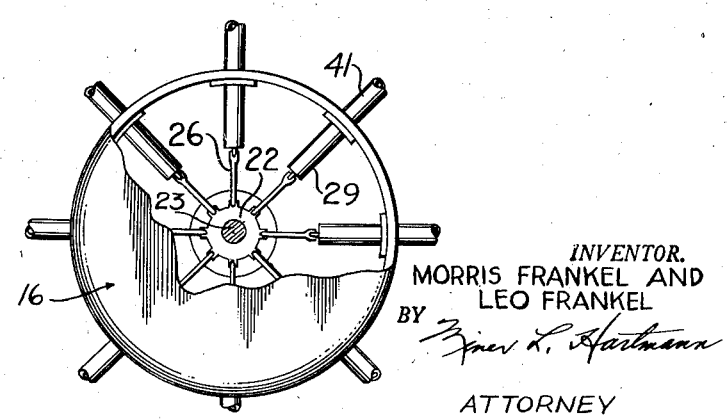
Fig. 3 is a top view of the same, with parts broken away to show the interior arrangement of parts.

In general, the invention consists of a pneumatic tube for a tire assembly usually including an outer casing and a metallic rim adapted to encompass the wheel, in the usual manner, the tube being made up or divided into radial segments by transverse partition walls, each segmental portion being independently inflatable, so that if one portion is punctured and becomes deflated, the other segments expand to fill in the deflation space, so that the tire may continue in service without interruption in its use.

Referring to the drawing, the inner tube 11 is mounted on the steel rim 12 within the casing 13, with a primary stem valve, or tire valve, 14 pneumatically connecting the tube interior to the outside, through the rim 12, for inflation and deflation, in the usual manner. The tube 11 is divided into segments 11a, 11b, 11c, 11d, etc., by transverse radial partitions 15, eight being shown although this number may be more or less, depending upon the size of the tire, its expansibility, etc. Within one segment, for example, 11a, is provided a multiple valve device 16, which is connected through the tire wall 17 to the primary stem valve 14, the stem being threaded so that the nut 18 holds the parts together, pneumatically sealed.

The multiple valve device 16 consists of a pneumatic chamber 20, provided, as noted above, with the primary stem valve 14 having the valve rod 21 extending into the interior of the housing, and connected at its inner end to the toggle disk 22. An extension 23 of the rod 21 is provided to slide in the bearing 24 attached to the inner side of the housing 20 opposite the primary valve 14, this bearing and extension rod 23 serving to keep the rod 21 aligned in the valve 14. The toggle disk 22 is provided with pivoting means 25 for the ends of each of the toggle lever arms 26, connecting by pivot means 27 with the central rods 28 of each of the eight distributing stem valves 29, which are attached to the sides of the valve chamber 20, and at right angles to the primary stem valve 14.

The stemmed tire valves 29 and 14 (in the primary valve) may be any of the commonly used tire inflation valves having a stem, a valve mechanism inside the stem, with a valve rod for opening the valve against a closing spring means, those shown having central rods 21 and 28, held in position by the apertured threaded plugs 30 screwed into the threaded inside wall of the stem, with a spring means 31 (shown in dotted lines) holding the valve inner tube 32 in closed position in the cupped seat 33, the gasketed plug 34 in the tapered seat 35 in the stem preventing leakage of air out through the opening in the plug 30. The central rods 28 extend beyond the stems at the entrance end to provide for pivoting to the lever arms 26 at the pivots 27. Inside threads 38 are provided at the outlet of the valves 29 and in the wall of the chamber 20 for attachment to the threaded end fitting 40 of one of the distributing flexible hoses 41b, 41c, 41d, etc., which lead to the several segments 11b, 11c, 11d, etc., of the tire 11. No hose is required for the segment 11a in which the valve chamber 16 is attached. The hose 41b passes through the partition wall 15 into the segment 11b, and pneumatically connects the segment 11b to the chamber 16 through one valve 28; the hose 41c passes through the partition walls 15 between segments 11a and 11b, 11b and 11c, and pneumatically connects the chamber 16 through another valve 28; the other segments of the tube 11 being similarly pneumatically connected by hoses 41 with other valves 28 to the chamber 16, so that each segment is served through its connecting hose to its separate distributing valve in the chamber 16, from which the segments may be simultaneously inflated.

On inflation, the air supply conduit is applied at the usual outer end of the primary stem valve 14; the rod 21 is pressed inwardly, opening the primary valve 14 and at the same time opening the distributing valves 29 through the movement of the toggle disk 22 and the lever arms 26, acting on the rods 28 through the pivots 27, thus admitting air to each hose 41, leading to each segment of the tire 11. For deflation, the central rod 21 of the primary valve 14 is pressed mechanically to open the valve, and this also opens the distributing valves 29, to release the air into the chamber 20 and thence to atmosphere through opened valve 14.

In use, assembled with a casing on a rim and wheel, if one segment is punctured, it is deflated, and as it deflates, the other segments expand to fill up the space, and the tire may continue in use without interruption until the punctured segment can be repaired. This is particularly important in military service where rolling equipment must be kept going.

While we have described a preferred embodiment of our invention, it will be understood that variations in details of construction may be made within the scope of the appended claims.

We claim:

1. A pneumatic tire comprising an annular rubber tube having transverse partition walls dividing the pneumatic space into radial segments; a multiple valve device for simultaneously inflating said segments, said device comprising a housing within one of said tire segments and attached to the inner wall thereof, a primary stemmed tire valve having a central valve rod forming a valved conduit leading from said housing to the outside for inflation service to said tire, a plurality of tire stemmed valves one for each segment of the tube, each having a central valve rod, said stemmed valves being attached at their outlet ends to the walls of said housing and forming valved conduits therethrough; toggle means connected between the inner end of the rod of said primary valve and the intake ends of the valve rods of said segment valves for actuating said rods; and a plurality of flexible conduits leading respectively from the outlets of said segment valves through the intervening partition walls of said tube to each pneumatic segment thereof.

2. In combination with an annular pneumatic tube divided into a plurality of separated segments, a multiple valve device for simultaneously inflating said segments comprising a housing attached within said tube to the inner wall thereof, a primary stemmed tire valve having a central valve rod communicating from outside the tube to the interior of said housing, a plurality of stemmed tire valves, one for each segment of said tube and each having a central valve rod disposed within said housing with the rods substantially at right angles to the valve rod of said primary valve, and toggle means connected between said primary valve rod at its discharge end and the rods of said tire valves leading to each of said tube segments, said toggle means being adapted to open said segment valves simultaneously with the opening of said primary valve.

MORRIS FRANKEL.
LEO FRANKEL.